US012662197B2

(12) United States Patent
    Kojima

(10) Patent No.: US 12,662,197 B2
(45) Date of Patent: Jun. 23, 2026

(54) VEHICLE-BODY FRAME STRUCTURE

(71) Applicant: SUBARU CORPORATION, Tokyo
    (JP)

(72) Inventor: Ryo Kojima, Tokyo (JP)

(73) Assignee: SUBARU CORPORATION, Tokyo
    (JP)

( * ) Notice: Subject to any disclaimer, the term of this
    patent is extended or adjusted under 35
    U.S.C. 154(b) by 312 days.

(21) Appl. No.: 18/519,699

(22) Filed: Nov. 27, 2023

(65) Prior Publication Data

US 2024/0199138 A1      Jun. 20, 2024

(30) Foreign Application Priority Data

Dec. 15, 2022    (JP) ................................. 2022-200647

(51) Int. Cl.
    B62D 25/20          (2006.01)
(52) U.S. Cl.
    CPC .................................... B62D 25/20 (2013.01)
(58) Field of Classification Search
    None
    See application file for complete search history.

(56) References Cited

U.S. PATENT DOCUMENTS

2019/0009832 A1 *    1/2019    Kageyama ........... B62D 21/157

FOREIGN PATENT DOCUMENTS

JP            6546487 B        7/2019

* cited by examiner

*Primary Examiner* — Nicholas McFall
(74) *Attorney, Agent, or Firm* — McGinn IP Law Group,
PLLC

(57)                ABSTRACT

A vehicle-body frame structure including a floor tunnel
includes a cross member floor front and a transmission cross
member. The cross member floor front is disposed at a
vehicle front end of the floor tunnel and has a vehicle-
widthwise cross-sectional shape that includes a first slant, a
second slant and a third slant. The first slant extends from the
vehicle bottom part toward an inward-and-upward side in a
vehicle width direction of the vehicle. The second slant
extends from a vehicle upper part of the first slant toward an
outward-and-upward side in the vehicle width direction. The
cross member floor front is formed by joining to each other
members divided in a vehicle up-down direction of the
vehicle on a vehicle upper side of the second slant. The
transmission cross member is fixed to the cross member
floor front on a vehicle upper side of the first slant.

2 Claims, 5 Drawing Sheets

VEHICLE-BODY FRAME STRUCTURE

CROSS-REFERENCE TO RELATED APPLICATIONS

The present application claims priority from Japanese Patent Application No. 2022-200647 filed on Dec. 15, 2022, the entire contents of which are hereby incorporated by reference.

BACKGROUND

The disclosure relates to a vehicle-body frame structure.

In general, a transmission, a propeller shaft extending in a vehicle front-rear direction, and the like are mounted to a vehicle-widthwise central part on a vehicle lower side of, for example, an automobile. The transmission is supported by supports such as a tunnel cross member and a transmission cross member. The tunnel cross member is laid between side frames provided on vehicle-widthwise outer sides. The transmission cross member fixes a vehicle rear part of the transmission.

The support for supporting the transmission, such as the tunnel cross member, is subjected through a suspension to the transmission of loads in a torsional direction and an up-down direction associated with travel of the vehicle. Furthermore, the load in the up-down direction is input from a rear part of the transmission to a central part of the transmission cross member. Then, a part where the transmission is fixed is sought to have rigidity capable of withstanding large stress in order to improve steering stability, noise resistance, riding quality, and the like of the vehicle.

On the other hand, an electric vehicle or the like, in which a battery unit is disposed underneath a floor and behind the transmission, is sought to strengthen the support for supporting the transmission or the battery unit in order to cope with an increase in weight due to, for example, mounting of a motor and to protect the battery unit.

In response to these requests, a technique is disclosed in which a vehicle rear part of a transmission is supported on a transmission cross member, and the transmission cross member is fixed so as to span an open lower space of a tunnel cross member (cross member floor front) laid between left and right front side frames (see, for example, Japanese Patent No. 6546487).

SUMMARY

An aspect of the disclosure provides a vehicle-body frame structure including a floor tunnel. The floor tunnel is disposed in a vehicle bottom part of a vehicle. The floor tunnel has a U shape, accommodates a vehicle rear part of a transmission and a propeller shaft of the vehicle, and extends in a front-rear direction of the vehicle at a vehicle-widthwise central part. The vehicle-body frame structure includes a cross member floor front and a transmission cross member. The cross member floor front is disposed at a vehicle front end of the floor tunnel. The cross member floor front has a vehicle-widthwise cross-sectional shape that includes a first slant, a second slant and a third slant. The first slant extends from the vehicle bottom part toward an inward-and-upward side in a vehicle width direction of the vehicle. The second slant extends from a vehicle upper part of the first slant toward an outward-and-upward side in the vehicle width direction. The third slant extends from a vehicle upper part of the second slant toward an inward-and-upward side in the vehicle width direction. The transmission cross member is fixed to the first slant of the cross member floor front. The vehicle rear part of the transmission is mounted on and fixed to the transmission cross member. The cross member floor front is formed by joining to each other members divided in a vehicle up-down direction of the vehicle on a vehicle upper side of the second slant. The transmission cross member is fixed to the cross member floor front on a vehicle upper side of the first slant.

BRIEF DESCRIPTION OF THE DRAWINGS

The accompanying drawings are included to provide a further understanding of the disclosure and are incorporated in and constitute a part of this specification. The drawings illustrate an embodiment and, together with the specification, serve to describe the principles of the disclosure.

DETAILED DESCRIPTION

Figure 1:
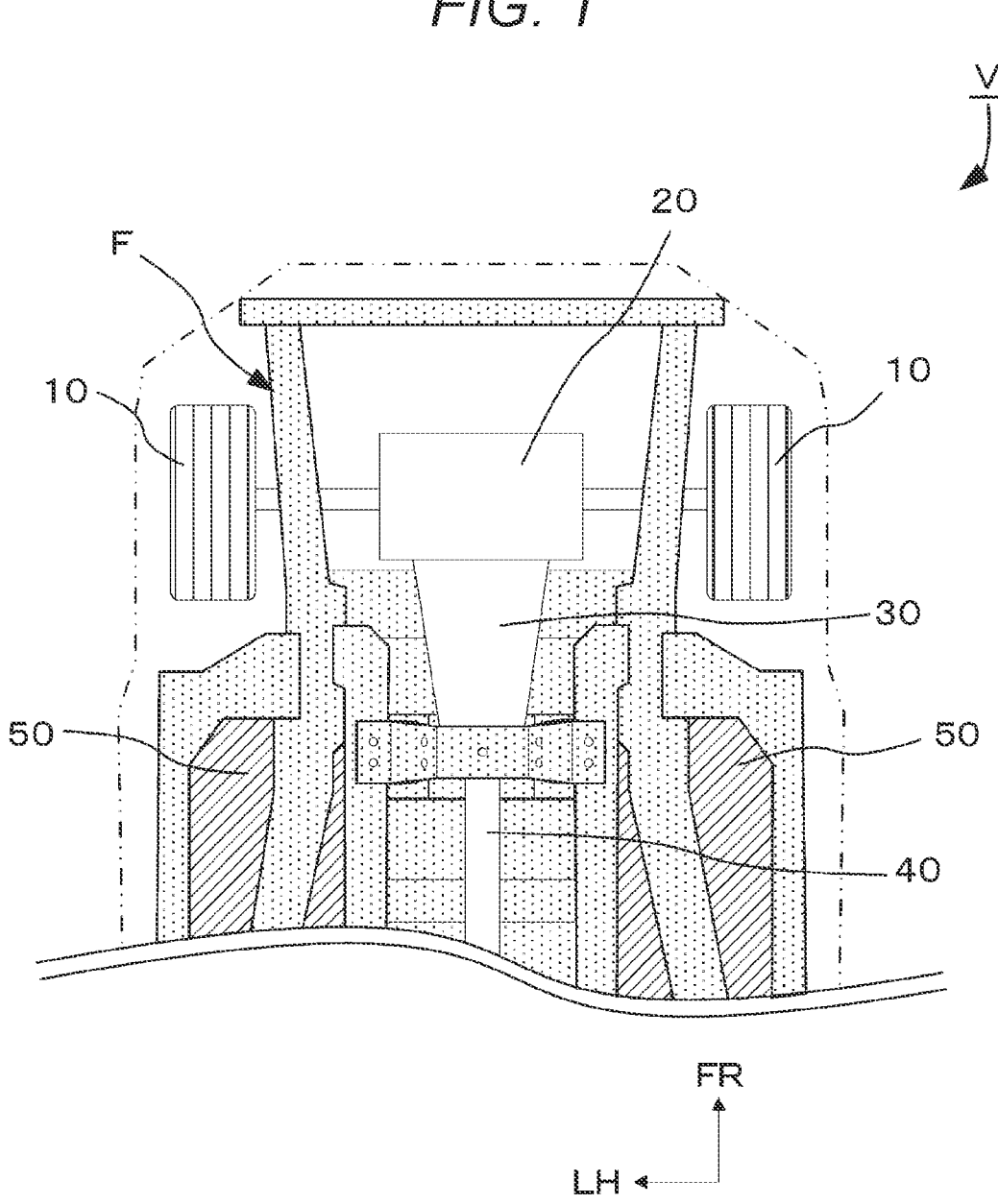
FIG. 1 is a configuration diagram of a vehicle according to an embodiment of the disclosure as viewed from a vehicle lower surface side.

In the technique described in Japanese Patent No. 6546487, the vehicle rear part of the transmission is supported by the transmission cross member alone attached to a lower part of the cross member floor front. Additionally, in the transmission cross member, a part where the transmission is fixed and a part where the cross member floor front is fixed are spaced apart from each other.

Thus, the technique has a problem that local deformation (distortion) occurs in the cross member floor front and the transmission cross member, resulting in unstable steering of the vehicle and increases in vibrations, transmission sounds, and the like.

Additionally, since the part where the cross member floor front is fixed in the transmission cross member is disposed on a substantially horizontal plane, the technique has a problem, for example, that a fastening member such as a fastening bolt protrudes toward the interior side, resulting in a small interior space.

It is desirable to provide a vehicle-body frame structure that improves rigidity of a transmission support while securing an interior space.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

With reference to FIGS. 1 to 5, a description will be given of a vehicle V to which a vehicle-body frame structure F according to the present embodiment is applied. Note that, arrow FR, arrow UP, and arrow LH, which are illustrated as appropriate in the drawings, point to a front side (front), an upper side in a front view, and a left side in a front view, respectively, of the vehicle V illustrated in FIG. 1. Additionally, in the following description, unless otherwise specified, an up-down direction, a front-rear direction, and a left-right direction refer to an up-down direction in a front view, a front-rear direction in a front view, and a left-right direction in a front view, respectively.

Embodiment

With reference to FIGS. 1 to 4, a description will be given of a configuration of the vehicle-body frame structure F, according to the present embodiment, included in the vehicle V.

Configuration of Vehicle V

The vehicle V is, for example, a vehicle including a power unit 20 with an internal combustion engine or an electric motor as a drive source. Note that, the vehicle V may be, for example, a hybrid electric vehicle including, as drive sources, an engine and an electric motor.

As illustrated in FIG. 1, the vehicle V includes front wheels 10, the power unit 20, a transmission 30, a propeller shaft 40, a floor panel 50 (diagonally shaded area in FIG. 1), and the vehicle-body frame structure F (dot hatched area in FIG. 1).

The power unit 20 is a drive apparatus including an internal combustion engine or a motor, a transmission, a clutch, a drive shaft, and the like (which are not illustrated) that drive the front wheels 10. For example, the power unit 20 is disposed in a vehicle front part and is supported by the vehicle-body frame structure F.

The transmission 30 is, for example, a transmission disposed in a vehicle front lower end and supported by the vehicle-body frame structure F. The transmission 30 is joined, on its vehicle front side, to the power unit 20, and coupled, on its vehicle rear side, to the propeller shaft 40 to be described later.

The propeller shaft 40 extends in a vehicle front-rear direction from a rear end of the transmission 30, and transmits a driving force transmitted from the power unit 20 to rear wheels via the transmission 30. The propeller shaft 40 is coupled, on its vehicle front side, to the transmission 30 and, on its vehicle rear side, to a rear-wheel differential gear (not illustrated).

The floor panel 50 is a floor material that is formed of a steel plate or the like, is provided in a vehicle lower part, and separates a cabin (not illustrated) in which an occupant and the like are accommodated from a vehicle exterior part including the vehicle-body frame structure F. The floor panel 50 extends in the vehicle front-rear direction and a vehicle width direction. The floor panel 50 is provided immediately above the vehicle-body frame structure F, and has a shape avoiding contact with, for example, constituent members constituting the vehicle-body frame structure F so as not to interfere with the constituent members. For example, in a case where bolts or the like for fixing the vehicle-body frame structure F protrude toward the floor panel 50, the floor panel 50 is shaped to have a protrusion protruding toward a vehicle interior inner side above a bolt BT as the fastening member. Furthermore, for example, above a floor tunnel FT to be described later, the floor panel 50 has a protrusion protruding toward the vehicle interior inner side and extending in the vehicle front-rear direction.

Configuration of Vehicle-Body Frame Structure F

Figure 2:
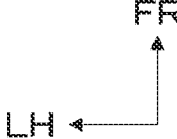
FIG. 2 is a configuration diagram of a vehicle-body frame structure illustrated in FIG. 1 as viewed from the vehicle lower surface side.

As illustrated in FIG. 2, the vehicle-body frame structure F includes a bumper beam 100, front side frames 110, a cross member 120, a torque box 130, side sills 140, and the floor tunnel FT as a transmission support.

The bumper beam 100 extends in the vehicle width direction on a vehicle front side and constitutes a vehicle front-side framework. The bumper beam 100 is formed of metal or the like and has a substantially rectangular closed cross-sectional shape. The bumper beam 100 is joined, by welding or the like, to vehicle front-side front ends of the front side frames 110 provided on vehicle-widthwise opposite sides.

The front side frames 110 are provided as a pair on vehicle-widthwise opposite sides of the vehicle front part, are located on vehicle-widthwise outer sides with respect to the power unit 20 that drives the front wheels of the vehicle V, and extend in the vehicle front-rear direction. The front side frames 110 constitute frameworks of the vehicle V, are formed of metal or the like having high rigidity, and each have a substantially rectangular closed cross-sectional shape. On locations adjacent to the vehicle front parts of the front side frames 110, front suspensions (not illustrated) supporting the front wheels 10, an engine mount supporting the power unit 20, and the like are joined. The power unit 20 is supported between the front side frames 110 provided on vehicle-widthwise opposite sides. Additionally, the front side frames 110 support, together with the power unit 20, the vehicle front side of the transmission 30 integrally coupled to the rear part of the power unit 20.

The cross member 120 extends in the vehicle width direction on a vehicle rear side of the power unit 20, and has both ends joined, by welding or the like, to the front side frames 110 provided on the vehicle-widthwise opposite sides. The cross member 120 is formed of metal or the like and has a substantially rectangular closed cross-sectional shape.

The torque box 130 is a framework extending in the vehicle width direction on a bottom surface of the vehicle V, and extends in the vehicle width direction on the vehicle rear side of the power unit 20. The torque box 130 is joined, on its vehicle-widthwise opposite sides, to the front side frames 110 by welding or the like. The torque box 130 is formed of metal or the like having high rigidity, and has a substantially rectangular closed cross-sectional shape.

The side sills 140 are provided on lateral bottom surfaces on the vehicle-widthwise opposite sides of the vehicle. The side sills 140 are joined, by welding or the like, to the vehicle-widthwise outer sides of the front side frames 110. Each of the side sills 140 is a framework extending in the vehicle front-rear direction, is formed of metal or the like having high rigidity, and has a substantially rectangular closed cross-sectional shape.

Configuration of Floor Tunnel FT

The floor tunnel FT as the transmission support is disposed, in a vehicle bottom part, to have a substantially U shape having a vehicle upper side bulging toward a vehicle interior inner side and having the vehicle lower side opened, to accommodate the vehicle rear part of the transmission 30, the propeller shaft 40, and the like, and to extend in the vehicle front-rear direction at the vehicle-widthwise central part. The vehicle rear part of the transmission 30 is fixed to the floor tunnel FT on the vehicle front side of the floor tunnel FT. Furthermore, a cabin (not illustrated) is disposed on the vehicle-widthwise outer sides and the vehicle upper side of the floor tunnel FT.

Figure 3:
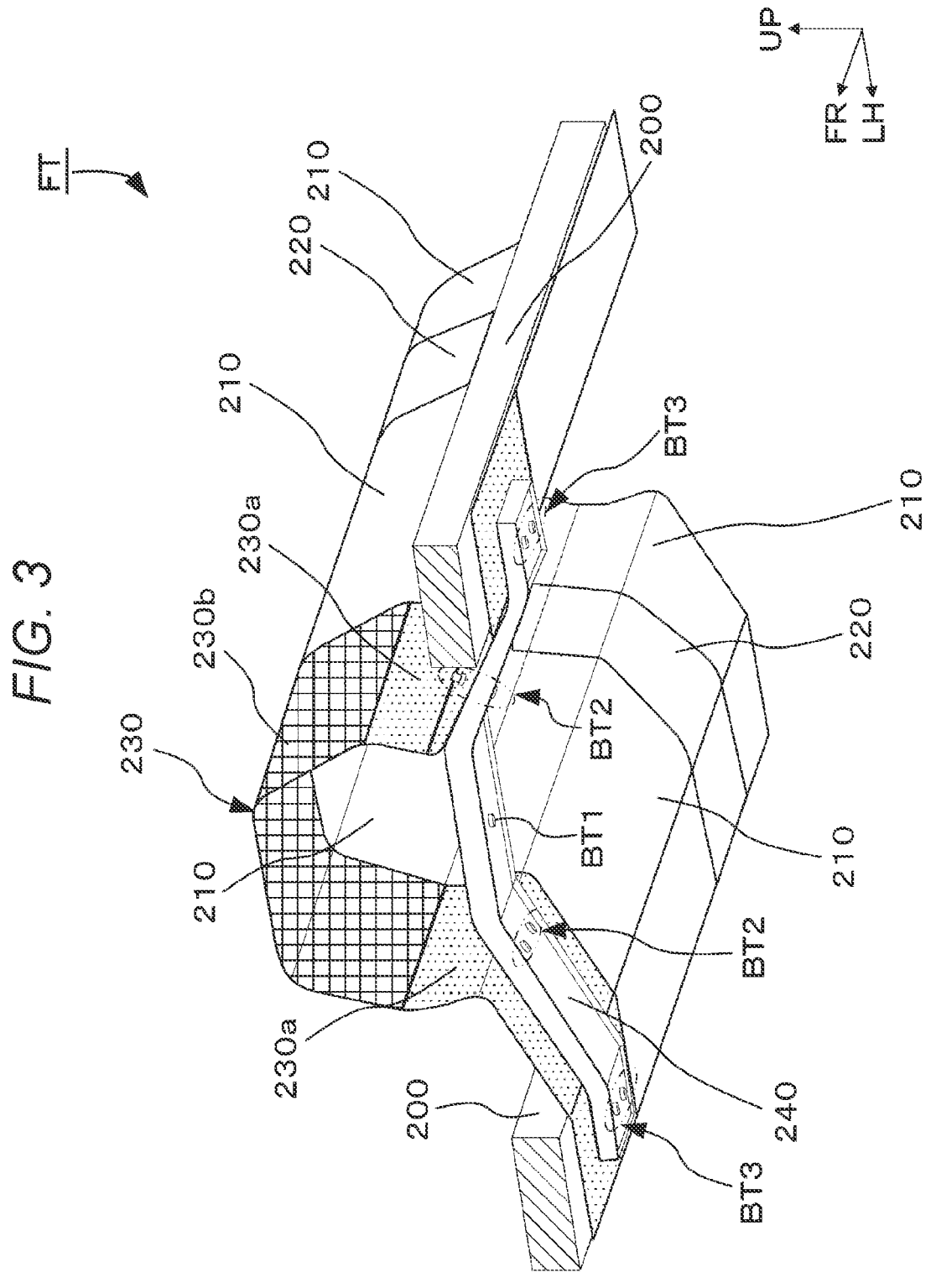
FIG. 3 is an enlarged perspective view of a floor tunnel as viewed from a lower surface side, illustrating a state where a transmission, a propeller shaft, and a floor panel are removed from FIG. 2.

As illustrated in FIG. 3, the floor tunnel FT includes tunnel side frames 200, a tunnel floor 210, a tunnel cross member 220, a cross member floor front 230, and a transmission cross member 240.

Tunnel Side Frames 200

Each of the tunnel side frames 200 is a framework extending in the vehicle front-rear direction along vehicle-widthwise opposite sides of the floor tunnel FT, is formed of metal or the like having high rigidity, and has a substantially rectangular closed cross-sectional shape. A vehicle front end of the tunnel side frame 200 is joined, by welding or the like, to the front side frame 110 and the torque box 130, and a vehicle rear end thereof is joined to a rear cross member (not illustrated). The tunnel cross member 220 and the cross member floor front 230 forming frameworks of the floor tunnel FT are joined to the tunnel side frames 200 by welding or the like.

Tunnel Floor 210

The tunnel floor 210 is a plate such as a steel plate that forms the substantially U shape of the floor tunnel FT. The tunnel floor 210 is provided in a vehicle lower part of the floor panel 50 and forms a wall of the floor tunnel FT. In one example, the tunnel floor 210 is disposed so as to cover gaps among the tunnel side frames 200, the tunnel cross member 220, the cross member floor front 230, and the transmission cross member 240, which form the frameworks of the floor tunnel FT, and the tunnel floor 210 is joined to each member by welding or the like.

Tunnel Cross Member 220

The tunnel cross member 220 extends in the vehicle width direction of the floor tunnel FT while forming a substantially U shape, and has vehicle-widthwise opposite ends joined, by welding or the like, to the tunnel side frames 200 provided on vehicle-widthwise opposite sides. The tunnel cross member 220 is a framework extending in the vehicle width direction of the floor tunnel FT, is formed of metal or the like having high rigidity, and has a substantially rectangular closed cross-sectional shape.

Cross Member Floor Front 230

The cross member floor front 230 is a member that maintains rigidity at a part where the transmission 30 is attached, extends in the vehicle width direction while forming a substantially U shape, and has vehicle-widthwise opposite ends joined, by welding or the like, to the tunnel side frames 200 provided on the vehicle-widthwise opposite sides.

Figure 4:
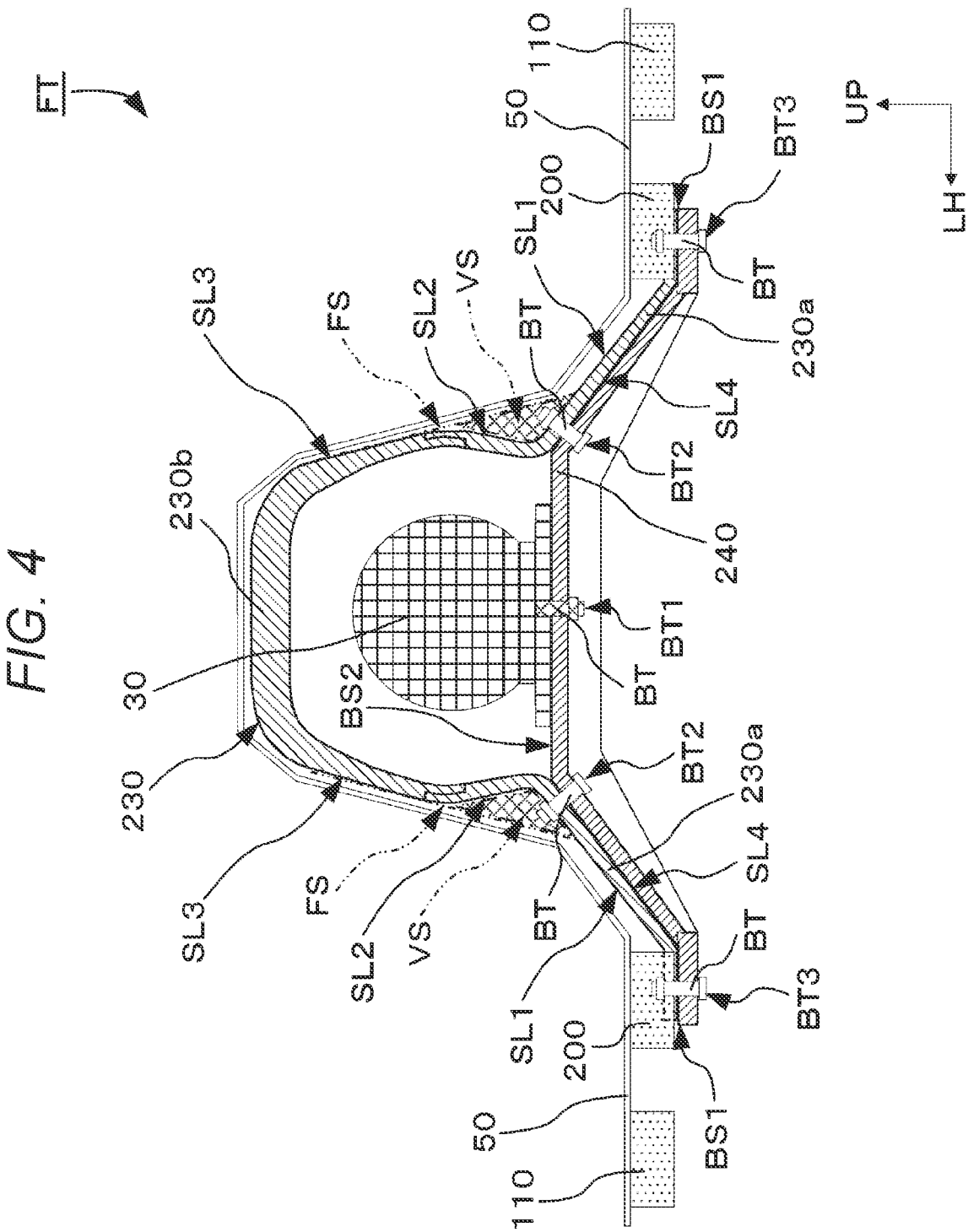
FIG. 4 is a cross-sectional view taken along line A-A as viewed in a direction of arrows A in FIG. 2.

As illustrated in FIG. 4, the cross member floor front 230 is disposed on the vehicle front end side of the floor tunnel FT and has a vehicle-widthwise cross-sectional shape with slants SL1, slants SL2, and slants SL3. The slants SL1 are each a first slant extending from the vehicle bottom part toward an inward-and-upward side in the vehicle width direction. The slants SL2 are each a second slant extending from a vehicle upper part of the slant SL1 toward an outward-and-upward side in the vehicle width direction. The slants SL3 are each a third slant extending from an upper part of the slant SL2 toward an inward-and-upward side in the vehicle width direction.

The slant SL1 is a slant inclined vehicle-widthwise inward from the joint between the cross member floor front 230a and the tunnel side frame 200 toward the vehicle upper side. On a vehicle upper side of the slant SL1, a fixing point BT2 is provided at which the transmission cross member 240 is fixed with the bolt BT as a fastening member.

The slant SL2 is a slant inclined vehicle-widthwise outward from the vehicle upper side of the slant SL1 toward the vehicle lower side of the slant SL3.

The slant SL3 is a slant inclined vehicle-widthwise inward from the vehicle lower side toward the vehicle upper side.

Then, the slant SL1, the slant SL2, and the slant SL3 form an inverse shape in which the slants inclined vehicle-widthwise inward and the slant inclined vehicle-widthwise outward are continuous with each other. Thus, a space VS is provided between the slant SL1, the slant SL2, and the floor panel 50.

Additionally, the cross member floor front 230 is formed by joining to each other members divided in the vehicle up-down direction on the vehicle upper side of the slants SL2. In one example, the cross member floor front 230 is formed by joining to each other cross member floor fronts 230a and a cross member floor front 230b by welding or the like. The cross member floor fronts 230a are disposed on the vehicle-widthwise opposite sides and each have the slant SL1 and the slant SL2. The cross member floor front 230b is disposed on the vehicle upper side of the cross member floor fronts 230a and has the slants SL3. With the inclination of the slants SL3, the cross member floor front 230b has an inverted V shape having, between vehicle-widthwise opposite sides, a vehicle-widthwise width on the vehicle lower side greater than a vehicle-widthwise width on the vehicle upper side.

Transmission Cross Member 240

The transmission cross member 240 has the vehicle rear part of the transmission 30 mounted and fixed, and is fixed to the cross member floor front 230 at the slants SL1 of the cross member floor front 230. In one example, the transmission cross member 240 is laid between the tunnel side frames 200 provided on vehicle-widthwise opposite sides, and is attached so as to span the open vehicle lower space of the tunnel cross member 220. The vehicle rear part of the transmission 30 is mounted to the vehicle upper-side central part of the transmission cross member 240, and the transmission 30 is fixed, with the bolt BT, to a fixing point BT1 provided in the transmission cross member 240.

The transmission cross member 240 is formed by subjecting steel or the like to pressing or the like. The steel or the like has substantially rectangular shape extending in the vehicle width direction in a plan view. The transmission cross member 240 is subjected to bending, drawing, and the like to secure strength.

Flat parts BS1 facing vehicle lower surface sides of the tunnel side frames 200 are formed on vehicle upper surface sides at vehicle-widthwise opposite ends of the transmission cross member 240. Additionally, the transmission cross member 240 includes slants SL4 each extending from a vehicle-widthwise inner part of the flat part BS1 toward an inward-and-upward side of the vehicle and being in contact with the slant SL1. A flat part BS2 is formed on a vehicle upper side of a protrusion to which the rear part of the transmission 30 is mounted, in a central part between the tunnel side frames 200.

The transmission cross member 240 is fixed, with the bolt BT, to the tunnel side frame 200 at a fixing point BT3 provided in the flat part BS1. Furthermore, the transmission cross member 240 is fixed, with the bolt BT as the fastening member, to the cross member floor front 230 at the fixing point BT2 provided on a vehicle upper side of the slant SL4.

OPERATION AND EFFECTS

The vehicle-body frame structure F according to the present embodiment with the above configuration involves securing of an interior space of the cabin in which the occupant and the like are accommodated, and absorbing vibrations conducted from a road surface or an engine during travel of the vehicle V, and torsion, bending, distortions, and the like generated in the floor tunnel FT that is the transmission support.

Hereinafter, with reference to FIG. 4, a description will be given of the floor tunnel FT and the interior space of the cabin.

The cabin (not illustrated) is disposed on the vehicle-widthwise outer sides and the vehicle upper side of the floor tunnel FT. The floor panel 50 that separates the vehicle-body frame structure F from the cabin is provided between the floor tunnel FT and the cabin. The floor panel 50 is provided to cover a region immediately above the vehicle-body frame structure F, and thus has a shape avoiding contact with constituent members that constitute the vehicle-body frame structure F and protrude toward the cabin so as not to interfere with the constituent members.

The cross member floor front 230 and the transmission cross member 240 constituting the floor tunnel FT are firmly fixed at the fixing points BT2 in order to secure rigidity. In one example, the bolt BT at the fixing point BT2 is disposed to pass through the cross member floor front 230 and to protrude toward the cabin disposed on the vehicle upper side.

On the other hand, the cross member floor front 230 has the vehicle-widthwise cross-sectional shape with the slants SL1, the slants SL2, and the slants SL3, and has a shape without a projection by joining to each other members divided in the vehicle up-down direction on the vehicle upper side of the slants SL2. Furthermore, the slant SL1, the slant SL2, and the slant SL3 have different inclination directions in the vehicle width direction, and thus the space VS is provided between the slant SL1, the slant SL2, and the floor panel 50. The fixing point BT2 is provided on the vehicle upper side of the slant SL1, and thus the bolt BT protruding toward the cabin is accommodated in the space VS. In other words, the bolt BT is accommodated in the space VS without protruding from an imaginary plane FS. The imaginary plane FS is obtained by extending, toward the vehicle lower side, a plane of the slant SL3 on the vehicle-widthwise outer side of the cross member floor front 230. Thus, the bolt BT as the fastening member does not affect the shape of the floor panel 50, and thus the interior space of the cabin is secured.

Figure 5:
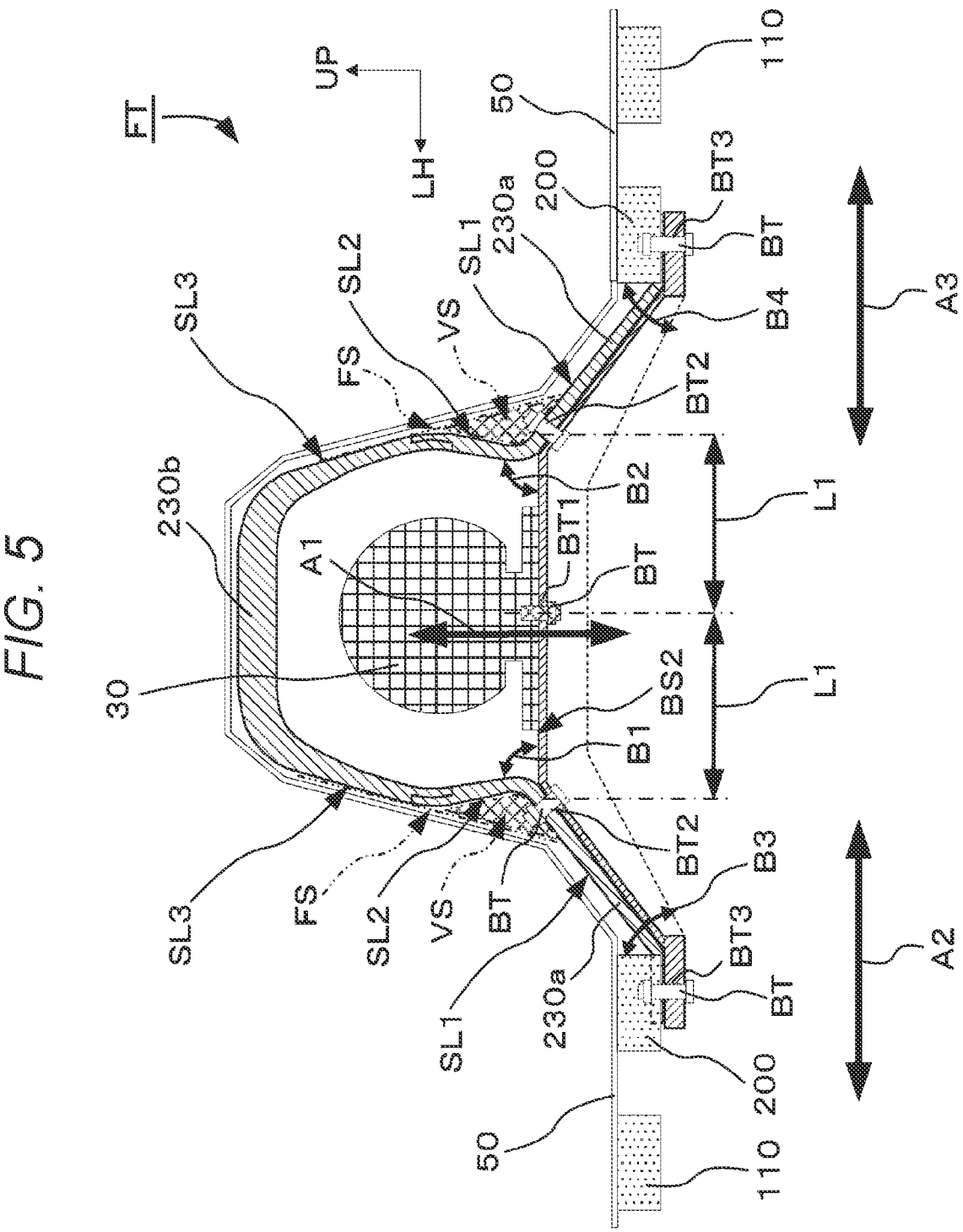
FIG. 5 is a cross-sectional view illustrating stress applied to a transmission cross member in FIG. 4.

Next, with reference to FIG. 5, a description will be given of a case where vibrations are transmitted to the floor tunnel FT.

During travel of the vehicle V, vibrations in the vehicle up-down direction (double arrows A1 in FIG. 5), vibrations in the vehicle width direction (double arrows A2 and A3 in FIG. 5), and vibrations in the vehicle front-rear direction (double arrows A4 not illustrated) are randomly generated. On the other hand, vibrations transmitted from the tunnel side frames 200 and vibrations transmitted from the transmission 30 are transmitted to the transmission cross member 240 fixing the vehicle rear part of the transmission 30. In other words, vibrations from the tunnel side frames 200 fixed at the fixing points BT3 and vibrations from the transmission 30 fixed at the fixing point BT1 are transmitted to the transmission cross member 240.

The vibrations transmitted from each of the tunnel side frames 200 are conducted from the flat part BS1 having the fixing point BT3 at which the transmission cross member 240 is fixed.

The vehicle front end of the tunnel side frame 200 is joined, by welding or the like, to the front side frame 110 and the torque box 130, the vehicle rear end thereof is joined to the rear cross member (not illustrated), and the tunnel side frame 200 is directly joined to the framework that is the center of the vehicle-body frame structure F. On the other hand, the firm frameworks of the floor tunnel FT are formed by joining, to the tunnel side frames 200, the tunnel cross member 220, the cross member floor front 230, and the transmission cross member 240 which extend in the vehicle width direction. The tunnel floor 210 is disposed so as to cover the gaps among the frameworks, and is joined to each member by welding or the like. Thus, the vibrations conducted to the transmission cross member 240 from the flat part BS1, which is the contact surface with the tunnel side frame 200, are vibrations distributed to the vehicle-body frame structure F, and do not greatly affect the floor tunnel FT. Additionally, the vibrations conducted from the flat part BS1 to the transmission cross member 240 are distributed to and absorbed in the firm frameworks constituting the floor tunnel FT.

The vibrations transmitted from the transmission 30 are transmitted from the flat part BS2 of the transmission cross member 240.

The transmission 30 is a transmission supported by the vehicle-body frame structure F and is a heavy apparatus. Furthermore, the transmission 30 is joined, on its vehicle front side, to the power unit 20, and coupled, on its vehicle rear side, to the propeller shaft 40. Thus, vibrations including torsion, bending, distortions, and the like are transmitted from the flat part BS1 of the transmission cross member 240, via the fixing point BT1, to the transmission cross member 240 to which the vehicle rear part of the transmission 30 is fixed.

The flat part BS1 of the transmission cross member 240 vibrates with the fixing point BT2 and the fixing point BT3 as fulcrums owing to the vibrations transmitted from the transmission 30.

Additionally, when the flat parts BS1 vibrate with the fixing points BT2 as fulcrums, the cross member floor front 230 and the transmission cross member 240 are subjected, as indicated by double arrows B1 and B2, to vibrations such as being opened and closed relative to each other.

Here, since the fixing point BT2 is disposed in the vehicle upper part of the slant SL1, the cross member floor front 230 and the transmission cross member 240 are kept in close contact with each other in the slant SL1. Additionally, a length Li between the fixing point BT1 and the fixing point BT2 is configured to be smaller than a case where the fixing point BT2 is provided in a vehicle lower part of the slant SL1. Thus, the movement of opening and closing the cross member floor front 230 and the transmission cross member 240 indicated by double arrows B1 and B2 is reduced because the fixing point BT2 is disposed in the vehicle upper part of the slant SL1. Additionally, local stress generated in the transmission cross member 240 is reduced, and thus, is distributed to the cross member floor front 230 and the transmission cross member 240. On the other hand, the firm frameworks of the floor tunnel FT are formed by joining, to the tunnel side frames 200, the tunnel cross member 220, the cross member floor front 230, and the transmission cross member 240 which extend in the vehicle width direction. The tunnel floor 210 is disposed so as to cover the gaps among the frameworks of the floor tunnel FT, and is joined to each member by welding or the like. Thus, the vibrations conducted from the flat parts BS1 to the transmission cross member 240 are distributed to and absorbed in the firm frameworks constituting the floor tunnel FT.

Additionally, when the flat parts BS1 vibrate with the fixing points BT3 as fulcrums, the cross member floor front 230 and the transmission cross member 240 are subjected to vibrations in the directions indicated by double arrows B3 and B4.

The cross member floor front 230 and the transmission cross member 240 are firmly fixed to each other at the fixing points BT2 and the fixing points BT3 with the slants SL1 and the slants SL4 being in contact with each other. The cross member floor front 230 and the transmission cross member 240 are firmly fixed to the tunnel side frames 200 at the fixing points BT3. Thus, the vibrations with the fixing points BT3 as fulcrums are distributed to the floor tunnel FT, and are distributed to and absorbed in the firm frameworks such as the front side frames 110, the torque box 130, and the side sills 140 via the tunnel side frames 200.

As described above, the vehicle-body frame structure F according to the present embodiment is the vehicle-body frame structure F including the tunnel side frames 200 extending in the vehicle front-rear direction along the vehicle-widthwise opposite sides of the floor tunnel FT disposed, in the vehicle bottom part, to have the U shape, to accommodate the rear part of the transmission 30 and the propeller shaft 40, and to extend in the front-rear direction at the vehicle-widthwise central part. The vehicle-body frame structure F includes: the cross member floor front 230 disposed at the vehicle front end of the floor tunnel FT and having the vehicle-widthwise cross-sectional shape with the slants SL1, the slants SL2, and the slants SL3, the slants SL1 each being the first slant extending from the vehicle bottom part toward the inward-and-upward side in the vehicle width direction, the slants SL2 each being the second slant extending from the vehicle upper part of the slant SL1 toward the outward-and-upward side in the vehicle width direction, and the slants SL3 each being the third slant extending from the vehicle upper part of the slant SL2 toward the inward-and-upward side in the vehicle width direction; and the transmission cross member 240 having the vehicle rear part of the transmission 30 mounted and fixed, and fixed to the slants SL1 of the cross member floor front 230. The cross member floor front 230 is formed by joining to each other members divided in the vehicle up-down direction on the vehicle upper side of the slants SL2. The transmission cross member 240 is fixed to the cross member floor front 230 on the vehicle upper side of the slants SL1.

When the flat part BS1 of the transmission cross member 240 vibrates with, as a fulcrum, the fixing point BT2 at which the cross member floor front 230 and the transmission cross member 240 are fixed, the cross member floor front 230 and the transmission cross member 240 are subjected to vibrations such as being opened and closed relative to each other. Since the fixing point BT2 is disposed in the vehicle upper part of the slant SL1, the length Li between the fixing point BT1 and the fixing point BT2 is configured to be small. Thus, the movement of opening and closing the cross member floor front 230 and the transmission cross member 240 is reduced, and the local stress generated in the transmission cross member 240 is reduced and thus is distributed to the cross member floor front 230 and the transmission cross member 240.

That is, since the transmission cross member 240 is fixed to the cross member floor front 230 on the vehicle upper side of the slant SL1, the local stress generated in the transmission cross member 240 can be distributed to the cross member floor front 230 and the transmission cross member 240. Additionally, the cross member floor front 230 has the vehicle-widthwise cross-sectional shape with the slants SL1, the slants SL2, and the slants SL3, and has the shape without the projection toward the vehicle interior inner side by joining to each other members divided in the vehicle up-down direction on the vehicle upper side of the slants SL2, thereby securing the vehicle interior space.

Thus, the rigidity of the transmission support can be improved while securing the interior space.

Furthermore, in the vehicle-body frame structure F according to the present embodiment, the bolt BT as a fastening member for fixing the transmission cross member 240 to the cross member floor front 230 is accommodated inside in the vehicle width direction with respect to the plane obtained by extending, toward a vehicle lower and outer side, the plane of the slant SL3 as the third slant on the vehicle-widthwise outer side of the cross member floor front 230.

That is, since the cross member floor front 230 has the vehicle-widthwise cross-sectional shape with the slants SL1, the slants SL2, and the slants SL3, the bolts BT at the fixing points BT2 can each be accommodated in the space VS without protruding from the space VS provided between the cross member floor front 230 and the floor panel 50. In other words, the bolt BT is accommodated in the space VS provided by the slant SL1, the slant SL2, and the floor panel 50. The transmission cross member 240 is firmly fixed to the fixing points BT2 in the vehicle upper parts of the slants SL1 of the cross member floor front 230, thereby securing high rigidity.

Thus, the rigidity of the transmission support can be improved while securing the interior space.

As the embodiment of the disclosure, the example has been described in which the transmission cross member 240 is formed by subjecting a plate material formed of a steel plate or the like to pressing, but the transmission cross member 240 may be formed of a cast member such as aluminum die-cast.

Although the embodiment of the disclosure has been described in detail with reference to the drawings, the specific configuration is not limited to the embodiment, and encompasses, for example, design variation within a scope not departing from the gist of the disclosure.

The invention claimed is:

1. A vehicle-body frame structure comprising a floor tunnel disposed in a vehicle bottom part of a vehicle, the floor tunnel having a U shape, accommodating a vehicle rear part of a transmission and a propeller shaft of the vehicle, and extending in a front-rear direction of the vehicle at a vehicle-widthwise central part, the vehicle-body frame structure comprising:

a cross member floor front disposed at a vehicle front end of the floor tunnel, the cross member floor front having a vehicle-widthwise cross-sectional shape that includes a first slant, a second slant and a third slant, the first slant extending from the vehicle bottom part toward an inward-and-upward side in a vehicle width direction of the vehicle, the second slant extending from a vehicle upper part of the first slant toward an outward-and-upward side in the vehicle width direction, and the third slant extending from a vehicle upper part of the second slant toward an inward-and-upward side in the vehicle width direction; and a transmission cross member being fixed to the first slant of the cross member floor front, wherein the vehicle rear part of the transmission is mounted on and fixed to the transmission cross member, the cross member floor front is formed by joining to each other members divided in a vehicle up-down direction of the vehicle on a vehicle upper side of the second slant, and the transmission cross member is fixed to the cross member floor front on a vehicle upper side of the first slant.

2. The vehicle-body frame structure according to claim 1, further comprising:

a fastening member fixing the transmission cross member to the cross member floor front, the fastening member being accommodated inside in the vehicle width direction with respect to an imaginary plane obtained by extending, to a vehicle lower and outer side, a plane of the third slant on vehicle-widthwise outer sides of the cross member floor front.

* * * * *